United States Patent
Shimoichi

(10) Patent No.: US 8,004,704 B2
(45) Date of Patent: Aug. 23, 2011

(54) SCANNER AND CONTROL METHOD FOR DISPLAY OF OPERATION MENU THEREOF

(75) Inventor: Eiji Shimoichi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1149 days.

(21) Appl. No.: 11/338,738

(22) Filed: Jan. 25, 2006

(65) Prior Publication Data

US 2007/0070397 A1    Mar. 29, 2007

(30) Foreign Application Priority Data

Sep. 22, 2005 (JP) ................................. 2005-276027

(51) Int. Cl.
*G06F 3/12* (2006.01)
(52) U.S. Cl. ...................................... 358/1.15; 358/1.13
(58) Field of Classification Search .................. 358/1.15, 358/1.13
See application file for complete search history.

(56) References Cited

U.S. PATENT DOCUMENTS

| | | | | |
|---|---|---|---|---|
| 5,964,851 | A | * | 10/1999 | Ueda ................................ 710/17 |
| 6,526,241 | B1 | | 2/2003 | Kishi et al. |
| 2004/0233474 | A1 | * | 11/2004 | Watanabe ...................... 358/1.15 |
| 2005/0154782 | A1 | * | 7/2005 | Yoshida ........................... 709/206 |
| 2006/0050292 | A1 | * | 3/2006 | Morikawa et al. ............ 358/1.13 |
| 2006/0215219 | A1 | * | 9/2006 | Yorimoto et al. ............. 358/1.15 |

FOREIGN PATENT DOCUMENTS

| | | |
|---|---|---|
| JP | A-54-92318 | 7/1979 |
| JP | A-2-44376 | 2/1990 |
| JP | A-2-74961 | 3/1990 |
| JP | A-5-72856 | 3/1993 |
| JP | A-5-127472 | 5/1993 |
| JP | A-5-138977 | 6/1993 |
| JP | Y2-2503745 | 4/1996 |
| JP | U-9-501 | 9/1997 |
| JP | A-10-301449 | 11/1998 |
| JP | B2-2861421 | 12/1998 |
| JP | A-2000-338826 | 12/2000 |

(Continued)

OTHER PUBLICATIONS

Refusing Reason Notice issued in Japanese Patent Application No. 2005-276027; mailed Sep. 14, 2010; with English-language translation.

(Continued)

*Primary Examiner* — Benny Tieu
*Assistant Examiner* — Qian Yang
(74) *Attorney, Agent, or Firm* — Oliff & Berridge, PLC

(57) ABSTRACT

A scanner which is connected via network or locally connected to a printer for realizing a copying function by outputting a scanned image to the printer as a copy job, the scanner, comprises a menu display that displays an operation menu of the copying function on a display portion; a capability information reception unit that receives capability information from the printer; an available setting item determination unit that determines print setting items relating to the copying function that can be provided, based on the capability information; and a display controller that selectively displays display contents of the operation menu displayed by the menu display, based on the setting items determined by the available setting item determination unit.

8 Claims, 11 Drawing Sheets

FOREIGN PATENT DOCUMENTS

| | | |
|---|---|---|
| JP | A 2001-337798 | 12/2001 |
| JP | A 2001-345974 | 12/2001 |
| JP | A-2002-244500 | 8/2002 |
| JP | A 2003-296068 | 10/2003 |
| JP | B2-3532474 | 5/2004 |
| JP | A 2004-345203 | 12/2004 |
| JP | A 2005-38056 | 2/2005 |
| JP | A 2006-270385 | 10/2006 |

OTHER PUBLICATIONS

Mar. 8, 2011 Office Action issued in Japanese Patent Application No. 2005-276027 (with translation).

Japanese Patent Office, Refusing Reason of Notice for Japanese Patent Application No. 2005-276027 (with English translation), Dec. 7, 2010, pp. 1-3.

* cited by examiner

| FUNCTION ID | FUNCTION NAME | TAB SCREEN | DISPLAY ITEM | CAPABILITY INFORMATION |
|---|---|---|---|---|
| FUNCTION 1 | COPY | BASIC | PAPER SELECTION | PAPER FEED TRAY CONFIGURATION (PRINTER) |
| | | | SCALING FACTOR SELECTION | SUPPORTED SIZE |
| | | | COLOR MODE | COLOR OR MONOCHROME PRINTER |
| | | | BOTH-SIDE / ONE-SIDE SELECTION | PROVISION OF BOTH-SIDE PRINTING FUNCTION |
| | | IMAGE QUALITY ADJUSTMENT | IMAGE QUALITY ADJUSTMENT | INFORMATION FOR DETERMINING COLOR OR MONOCHROME PRINTER TRC PARAMETERS |
| | | | ORIGINAL IMAGE QUALITY | |
| | | | REMOVAL OF BACKGROUND COLOR | |
| | | | COLOR BALANCE | |
| | | | SHARPNESS | |
| | | | SATURATION | |
| | | | | |
| | | | | |
| | | | ¦ | ¦ |
| | | OTHERS | | |
| | | | | |
| | | | | |
| FUNCTION 2 | MAIL TRANSMISSION | | | |
| FUNCTION 3 | STORAGE | | | |

FIG.3

|  | A3 PRINTER | A4 PRINTER |
|---|---|---|
| A3 SCANNER | 100%<br>AUTOMATIC %<br>50%    A3→A5<br>70%    A3→A4 / B4→B5<br>81%    A3→B4 / B5→A5<br>86%    A3→B4 / A4→B5<br>115%   B4→A3 / B5→A4<br>122%   A4→B4 / A5→B5<br>141%   A4→A3 / B5→B4<br>200%   A5→A3 | 100%<br>AUTOMATIC %<br>50%    A3→A5<br>70%    A3→A4 / B4→B5<br>81%    A3→B4 / B5→A5<br>86%    A3→B4 / A4→B5<br>115%   B5→A4<br>122%   A5→B5 |
| A4 SCANNER | 100%<br>AUTOMATIC %<br>70%    A4→A5<br>81%    B5→A5<br>86%    A4→B5<br>115%   B5→A4<br>122%   A4→B4 / A5→B5<br>141%   A4→A3 / B5→B4<br>200%   A5→A3 | 100%<br>AUTOMATIC %<br>70%    A4→A5<br>81%    B5→A5<br>86%    A4→B5<br>115%   B5→A4<br>122%   A5→B5 |

FIG.4

|  | DETECTED ORIGINAL DOCUMENT SIZE | A3 PRINTER | A4 PRINTER |
|---|---|---|---|
| A3 SCANNER | A3 | 100%<br>AUTOMATIC %<br>50%  A3→A5<br>70%  A3→A4<br>81%  A3→B4<br>86%  A3→B4 | 100%<br>AUTOMATIC %<br>50%  A3→A5<br>70%  A3→A4 |
| ↑ | B4 | 100%<br>AUTOMATIC %<br>70%  B4→B5<br>81%  B4→A4<br>115%  B4→A3 | 100%<br>AUTOMATIC %<br>70%  B4→B5<br>81%  B4→A4 |
| ↑ | A4 | 100%<br>AUTOMATIC %<br>70%  A4→A5<br>86%  A4→B5<br>122%  A4→B4<br>141%  A4→A3 | 100%<br>AUTOMATIC %<br>70%  A4→A5<br>86%  A4→B5 |
| ↑ | B5 | 100%<br>AUTOMATIC %<br>81%  B5→A5<br>115%  B5→A4<br>141%  B5→B4 | 100%<br>AUTOMATIC %<br>81%  B5→A5<br>115%  B5→A4 |
| ↑ | A5 | 100%<br>AUTOMATIC %<br>122%  A5→B5<br>141%  A5→A4<br>200%  A5→A3 | 100%<br>AUTOMATIC %<br>122%  A5→B5<br>141%  A5→A4 |
| A4 SCANNER | A4 | 100%<br>AUTOMATIC %<br>70%  A4→A5<br>86%  A4→B5<br>122%  A4→B4<br>141%  A4→A3 | 100%<br>AUTOMATIC %<br>70%  A4→A5<br>86%  A4→B5 |
| ↑ | B5 | 100%<br>AUTOMATIC %<br>81%  B5→A5<br>115%  B5→A4<br>141%  B5→B4 | 100%<br>AUTOMATIC %<br>81%  B5→A5<br>115%  B5→A4 |

FIG.5

|  | HAVING BOTH-SIDE PRINTING FUNCTION | NOT HAVING BOTH-SIDE PRINTING FUNCTION |
|---|---|---|
| ONE-SIDE⇔ONE-SIDE | ○ | ○ |
| BOTH-SIDE⇔ONE-SIDE | ○ | ○ |
| ONE-SIDE⇒BOTH-SIDE | ○ | − |
| BOTH-SIDE⇔BOTH-SIDE | ○ | − |
| HORIZONTAL 2-UP | ○ | − |
| VERTICAL 2-UP | ○ | − |
| LEFT-ORIENTED | ○ | − |
| RIGHT-ORIENTED | ○ | − |

FIG.6

SCANNER AND CONTROL METHOD FOR DISPLAY OF OPERATION MENU THEREOF

BACKGROUND OF THE INVENTION

1. Field of the Invention

The present invention relates to a scanner that is connected via network or locally connected to a printer to realize a copying function by outputting a scanned image to the printer as a copy job, and to a control method for the display of an operation menu thereof. More particularly, the present invention relates to a scanner that is designed to improve its usability by selectively displaying the display contents of an operation menu that can be operated based on capability information of the printer, and to a control method for the display of an operation menu of such scanner.

2. Description of the Related Art

There has recently been proposed a system to realize a copy function without using a personal computer. In this system, a printer is connected to a scanner via a network, and an image scanned by the scanner is transmitted to the printer as a copy job.

In such system, a variety of models of printers having a variety of functions may be connected to the scanner.

In such system, even if a user sets several setting items on the scanner's operation menu to realize desired copy functions, some of those functions may not be available or may be restricted on the printer side, resulting in that the user cannot obtain his/her desired print-out, or, in some cases, the user may receive an error message.

The UI (User Interface) that is displayed on an operation panel as an operation menu for the copying functions is typically several examples of paper size enlargement and reduction, whereby selectable scaling factors are determined based on the regular paper sizes supported by the scanner and the regular paper sizes supported by the printer which prints out the scanned image.

If the scanner is a color scanner, selectable items are restricted for the functions available on a monochrome printer compared to the functions available on a color printer.

This makes it necessary to change the display contents on the side of the scanner according to the model of the printer connected thereto.

Further, it is also required to change the designation of the print out pattern when performing both-side printing, depending on whether or not an original document to be scanned by the scanner is both-side printed, and depending on whether or not the printer has a paper feed mechanism for both-side printing.

Thus, in order to realize a copying function in the configuration in which a scanner and a printer connected to the printer, the operation menu for various functions relating to the copying function need to be changed according to the capability of the equipment and types of original documents to be scanned.

Conventionally, there has been known a technique relating to a copying function to use a printer to print out an image scanned by a scanner, and this technique is disclosed in Japanese Patent Application Publication No. 2001-345974, titled "Device for Information Processing and Method for Image Processing, Storage Medium, and Program".

The invention disclosed in the Japanese Patent Application Publication No. 2001-345974 aims to facilitate, when utilizing the copying function, the setting operation for reading an image and the setting operation for printing the read image without depending on the configuration of the equipment, wherein input setting information relating to image reading processing for the copying function and output setting information relating to print processing are prestored in a memory, so that image processing is performed in an image processing mode selected by the operator.

According to the Japanese Patent Application Publication No. 2001-345974, however, setting information corresponding to capabilities of possibly connected equipment models need be previously registered in the memories of both the scanner and the printer. Moreover, the setting information need be changed every time the connection configuration is changed.

Furthermore, another problem is posed that any other equipment than those whose setting information has previously been registered cannot be used.

SUMMARY OF THE INVENTION

The present invention has been made in view of the above circumstances and to provide a scanner having improved usability by being designed to receive and detect capability information of a printer upon connection thereof and to control the menu display of the copying function based on the detected capability information, and a control method for the display of the operation menu of such scanner.

According to an aspect of the present invention, a scanner which is connected via network or locally connected to a printer for realizing a copying function by outputting a scanned image to the printer as a copy job, the scanner, comprises a menu display that displays an operation menu of the copying function on a display portion; a capability information reception unit that receives capability information from the printer; an available setting item determination unit that determines print setting items relating to the copying function that can be provided, based on the capability information; and a display controller that selectively displays display contents of the operation menu displayed by the menu display, based on the setting items determined by the available setting item determination unit.

With the scanner and the control method for the display of the operation menu thereof of the present invention, only selectable setting items are displayed based on capability information of the scanner and capability information of the printer, whereby copying error can be prevented.

Further, when the model of the printer connected to the scanner is changed and the capability of the printer is differed from the previous one, the menu will be restructured to change the display contents corresponding to the capability of the printer. Therefore, even if the model of the printer connected to the scanner is changed and the capability of the printer is differed from the previous one, the user is not required to register any special setting information or to do any operation to change the setting information, and is allowed to easily operate and utilize the copying function without paying attention to the capability of the scanner or of the printer.

BRIEF DESCRIPTION OF THE DRAWINGS

Embodiment of the present invention will be described in detail based on the following figures, wherein:

FIG. 3 is a table showing an example of types of displayed screens and screen management information for managing display items for each of functions that can be displayed on a main menu;

FIG. 4 is a table showing an example of a matrix table of a list of selectable enlargement and reduction ratios determined by a combination of a maximum regular size of paper supported by the printer and a maximum regular size of paper supported by the scanner;

FIG. 5 is a table showing an example of a matrix table of a list of selectable enlargement and reduction ratios for each combination of an original document size detected by the prescanning function of the scanner and a maximum paper size supported by the printer;

FIG. 6 is a table showing display object attributes of combination patterns between original document sides to be scanned (one-side or both-sides) and paper sides to be printed (one-side or both-sides) for a case in which the both-side printing function is possible in the printer capability information and for a case in which the both-side printing function is not possible;

DETAILED DESCRIPTION OF THE INVENTION

A description will now be made on a scanner and a control method for the display of the scanner's operation menu according to the present invention, with reference to the accompanying drawings.
(System Configuration)

Figure 1:
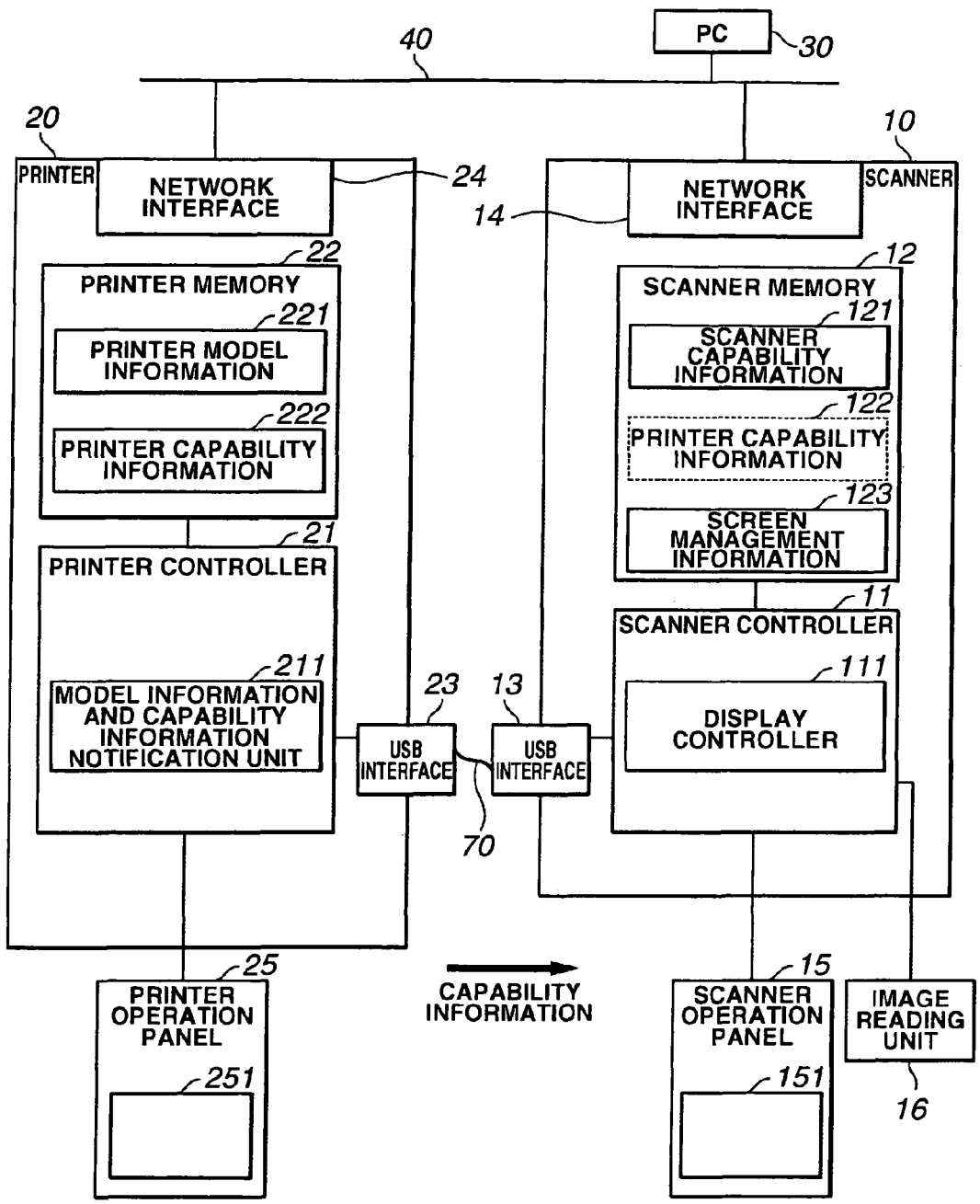
FIG. 1 is a block diagram showing a configuration of a printing system to which a scanner and its operation menu display control method according to an embodiment of the present invention are applied, and respective configuration of a printer and a scanner.

FIG. 1 is a block diagram illustrating a configuration of a printing system to which the scanner and the control method for the display of its operation menu according to an embodiment of the present invention are applied and respective configuration of a scanner 10 and a printer 20 in the printing system according to the embodiment.

As shown in FIG. 1, the scanner 10 has a conventional image scanning function to scan an original document image, and a copying function to print out the scanned image by using the printer 20 connected to the scanner via a USB cable (hereafter, to be referred to as the "copy function"). The scanner 10 operates as a USB host with respect to the printer 20, and the printer 20 operates as a USB client.

The scanner 10 has a function to acquire capability information of the printer 20 upon detecting connection of the printer 20, and controls the display of an operation menu displayed by a scanner display portion of a scanner operation panel based on the capability information thus acquired and capability information of the scanner 10.

The printer 20 stores, in a printer memory 22, information on its paper feed tray and paper delivery tray, and printer capability information 222 on a maximum regular size of paper that can be loaded on and fed by the paper feed tray, whether or not the printer is capable of both-side printing, whether the printer is a color printer or a monochrome printer, information on parameters required for color conversion in the image processing if the printer is a color printer, and whether or not the printer has a hard disc. The printer 20 supplies the information upon request from the scanner 10.
(Scanner Configuration)

The scanner 10 includes a scanner controller 11, a scanner memory 12, a USB interface 13, a network interface 14, a scanner operation panel 15, and an image reading unit 16.

The scanner controller 11 is connected to the scanner memory 12, the USB interface 13, the network interface 14, the scanner operation panel 15, and the image reading unit 16 to integrally control the scanner 10 as a whole. In particular, the scanner controller 11 has a display controller 111 for controlling the display of an operation menu in a scanner display portion 151 of the scanner operation panel 15 and the display of setting screens for various functions.

The network interface 14 is a communication interface for performing data communication with a device such as a PC 30 connected via a network 40, including transfer of image data read by the image reading unit 16.

The USB interface 13 performs USB serial communication with the printer 20 connected via a USB cable 70.

The scanner operation panel 15 has a scanner display portion 151 which displays an operation menu for various functions including the copy function provided by the scanner 10. The scanner operation panel 15 also has operation buttons (not shown).

The scanner memory 12 stores a control program and control parameters for providing an image reading and processing function, a copy function for causing the printer 20 to print out the read image, and a save function to transfer the read image data to a device connected via the network 40 or to store the same in an external memory.

Particularly, the scanner memory 12 stores screen management information 123 relating to control of the display of operation menus and setting screens, printer capability information 122 that is printer capability information 222 acquired from the printer 20 and stored in a predetermined data format, and scanner capability information 121 indicating the image reading and processing capability of the scanner 10 itself.
(Printer Configuration)

The printer 20 includes a printer controller 21, a printer memory 22, a USB interface 23, a network interface 24, and a printer operation panel 25.

The printer controller 21 performs print control on a print engine (not shown) which converts an image of a copy job received from the scanner 10 via the USB network 23 and of a printing job received via the network interface into a page image and prints the page image on printing paper.

The printer controller 21 integrally controls the printer 20 as a whole, and has a capability information and printer model information notification unit 211 for controlling data communication to notify printer model information 221, and printer capability information 222 in response to a request from the scanner 10.

The printer memory 22 stores a control program and control parameters for functions provided by the printer 20, and, in particular, stores the printer model information 221 and the printer capability information 222 to be notified to the scanner 10 via the USB interface 23.

(Capability Information)

Figure 2:
FIG. 2 is a table showing an example of capability information notified from the printer to the scanner.

FIG. 2 shows an example of the printer capability information 222.

In FIG. 2, the printer capability information 222 includes information relating to the paper feed tray configuration and paper delivery tray configuration, information on a maximum size of paper loadable on the paper feed trays, information on whether the printer is a color printer or monochrome printer, information on parameters used for color conversion if the printer is a color printer, information on whether the printer has a mechanism for both-side printing, whether a hard disc is provided or not, and information on the memory capacity.

Among the information items managed by the printer 20 as the capability information, those information items marked with *1 in the column of "Information Notification Direction" are notified to the scanner 10 in response to a request from the scanner 10.

On the other hand, those items marked with *2 in the column of "Information Notification Direction" are information items which the printer 20 autonomously outputs and notifies to the scanner 10 while performing print processing.

(Screen Management Information)

An example of the screen management information 123 will now be described with reference to FIG. 3.

The screen management information 123 shown in FIG. 3 serves as control information for the scanner 10 to perform screen display control on the scanner display portion 151, and includes: "Function ID" that is identification information of functions provided by the scanner 10 and displayed on the main menu 60; "Function Name" indicating particulars of the functions corresponding to the function IDs; "Tab Screen" indicating identification information for tab switch screens which display settings prepared for each of the functions; "Display Item" that is identification information of items displayed on each of the tab switch screens; and "Capability Information" indicating criteria for deciding whether or not a certain item is to be displayed, and, if displayed, link information to a matrix table that is required for specifying selectable parameters.

(Matrix for Specifying Enlargement and Reduction Ratio)

FIG. 4 shows an example of a matrix table showing a list of selectable enlargement and reduction ratios determined by combinations of a maximum regular size of paper supported by the printer and a maximum regular size of paper supported by the scanner.

In the matrix table of FIG. 4, the maximum regular size of paper supported by the scanner is a maximum size of an original document that can be scanned by the scanner 10, while the maximum regular size of paper supported by the printer is a maximum size of paper that can be loaded on the printer 20.

The selectable enlargement and reduction ratios are specified based on combinations of the maximum paper sizes supported by the scanner 10 and the printer 20.

(Display of Enlargement and Reduction Ratios Narrowed Down Based on Prescanned Image Size)

FIG. 5 is a table showing a list of enlargement and reduction ratios narrowed down from the list of enlargement and reduction ratios determined by combinations of the capability information of the scanner 10 and the capability information of the printer 20 as shown in FIG. 4. The enlargement and reduction ratios shown in FIG. 5 correspond to combinations of a size of paper that is set on the image reading unit 16 of the scanner 10 and a maximum size of paper that can be loaded on the printer 20 connected to the scanner 10.

(Single-Side=>Both-Side)

FIG. 6 is a table showing a list of display object attributes of combination patterns between a number of original document sides to be scanned (one-side or both-sides) and paper sides to be printed (one-side or both-sides) for a case in which the both-side printing function is possible in the printer capability information and for a case in which the both-side printing function is not possible.

The information on whether or not the printer 20 has the both-side printing function is obtained from the printer capability information 222, and information on the original document sides that can be scanned by the image reading unit 16 of the scanner 10 is obtained from the scanner capability information 121. Selection parameters for the display items that are marked with a white circle in the columns of "Having Both-side printing function" and "Not Having Both-side printing function" are displayed in the setting menu as display objects.

When the printer 20 has the both-side printing function, and the original document to be scanned has an image printed on the both sides, the scanner 10 displays, in the menu, the selection items that are marked with a white circle in the column of "Having Both-side printing function" including "Both-Side=>Both-Side" for the scanned original document image.

Figure 7:
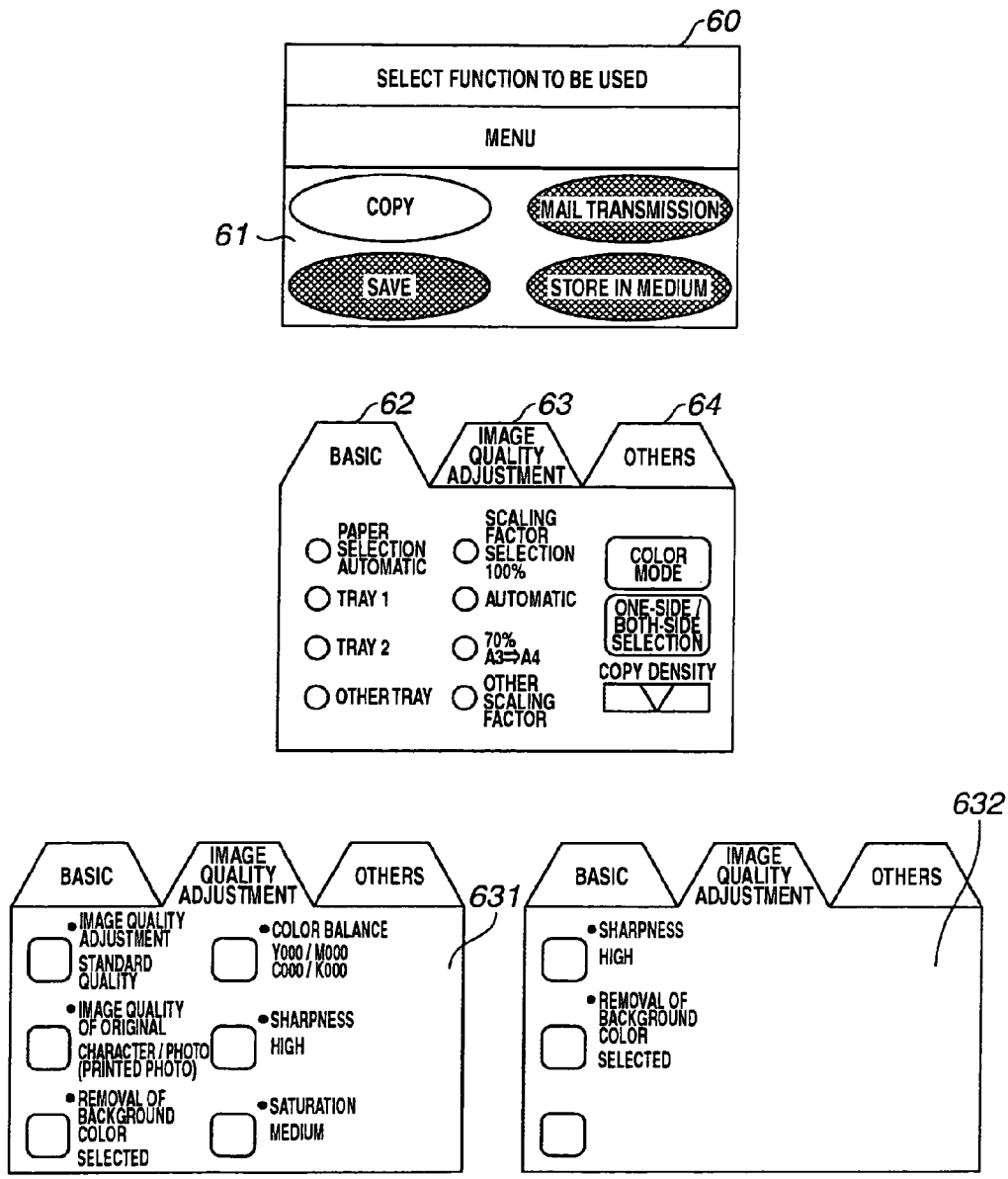
FIG. 7 shows screen images showing a function selection menu in which the copy function is selected, an example of a basic setting screen for the copy function that is displayed after the copy function is selected on the function selection menu, and examples of image quality adjustment screens displayed when the printer is a color printer and when it is a monochrome scanner, respectively, after the image quality adjustment is selected on the basic setting screen.

FIG. 7 shows screen images of a basic setting screen that is displayed when the copy function is selected on the function selecting menu, and of screens displayed when "Image Quality Adjustment" is selected from the basic setting screen for the cases when the printer is a color printer and a monochrome printer, respectively.

When an icon 61 indicating the copy function is selected on the main menu 60, a basic setting screen 62 that is designed to be switched by tabs is displayed as an initial screen for allowing the user to perform settings relating to the copy function, or settings relating to image processing and print processing of a scanned image.

The user selects desired setting items from those displayed on each of the tab switch screens to perform the copy operation.

For example, the "Image Quality Adjustment" tab 63 is selected from one of the tab switch screens on which the "Basic" screen 62 is displayed, the "Image Quality Adjustment" screen 63 is displayed, on which there are provided selection items relating to the image reading processing, and selection items relating to the image output processing for printing out the image on paper.

Settings for the image reading processing are determined by acquiring the scan resolution, scannable original document sizes, and gray scale number of the image reading unit 16 from the scanner capability information 121, and individually checking the display items corresponding to the "Image Quality Adjustment" and the parameter values for each of the display items, that are managed by the screen management information.

Further, it is determined whether the printer 20 is a color printer or a monochrome printer, based on a "number of output colors" notified by the printer capability information 222, or on the printer model information.

If it is determined that the printer 20 is a color printer, parameters relating to the color conversion processing are acquired from the printer capability information 222, and color printing is performed based on the parameters thus acquired. In this case, the brightness level of the image to be printed and the parameters relating to the image quality adjustment are specified to display the tab switch screen 631 as shown in FIG. 7.

In contrast, if it is determined that the printer 20 is a monochrome printer, the screen 632 having no display items relating to the color adjustment is displayed as shown in FIG. 7.

(Display of List of Enlargement and Reduction Ratios Corresponding to Printer Capability Information)

Figure 8:
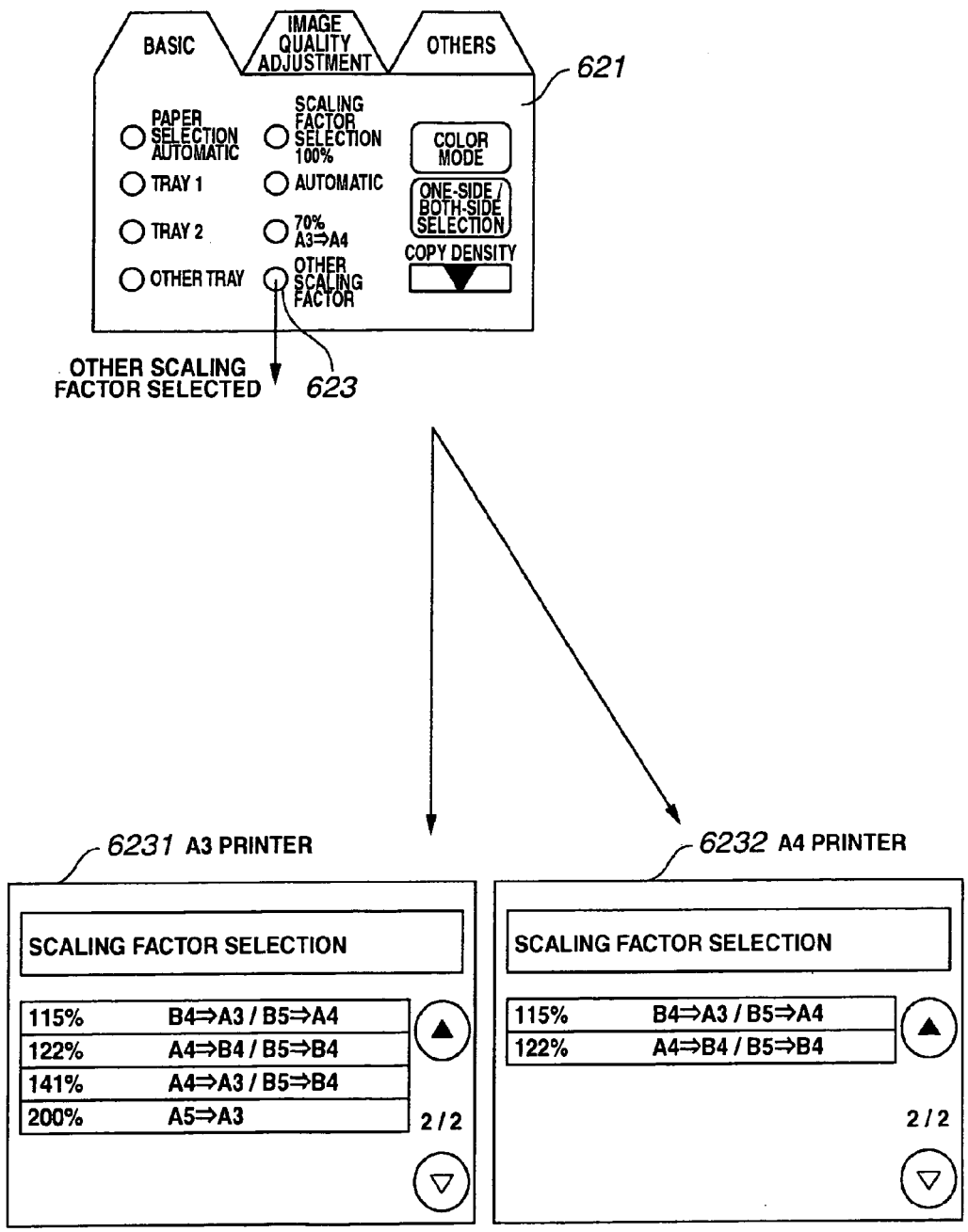
FIG. 8 shows screen images showing examples of screens which are displayed, when "Other Scaling Factor" is selected on the basic setting screen, and these screens show scaling factors that can be selected according to a maximum paper size that can be loaded on and fed by A3 and A4 printers, respectively.

FIG. 8 shows screen images displayed when the selectable scaling factors displayed on the basic setting screen 62 is displayed as selectable display scaling factors in correspondence with the sizes of paper that can be loaded on the printer 20.

When "Other Scaling Factor" 623 is selected on the basic setting screen 621, the scanner 10 determines based on the printer capability information 122 whether the printer is an A3 printer or an A4 printer, and displays a list of selectable enlargement and reduction ratios. For example, the scanner 10 displays a list of parameters specified based on the matrix tables shown in the screens 6231 and 6232 of FIG. 8.

(Sorting Function)

Figure 9:
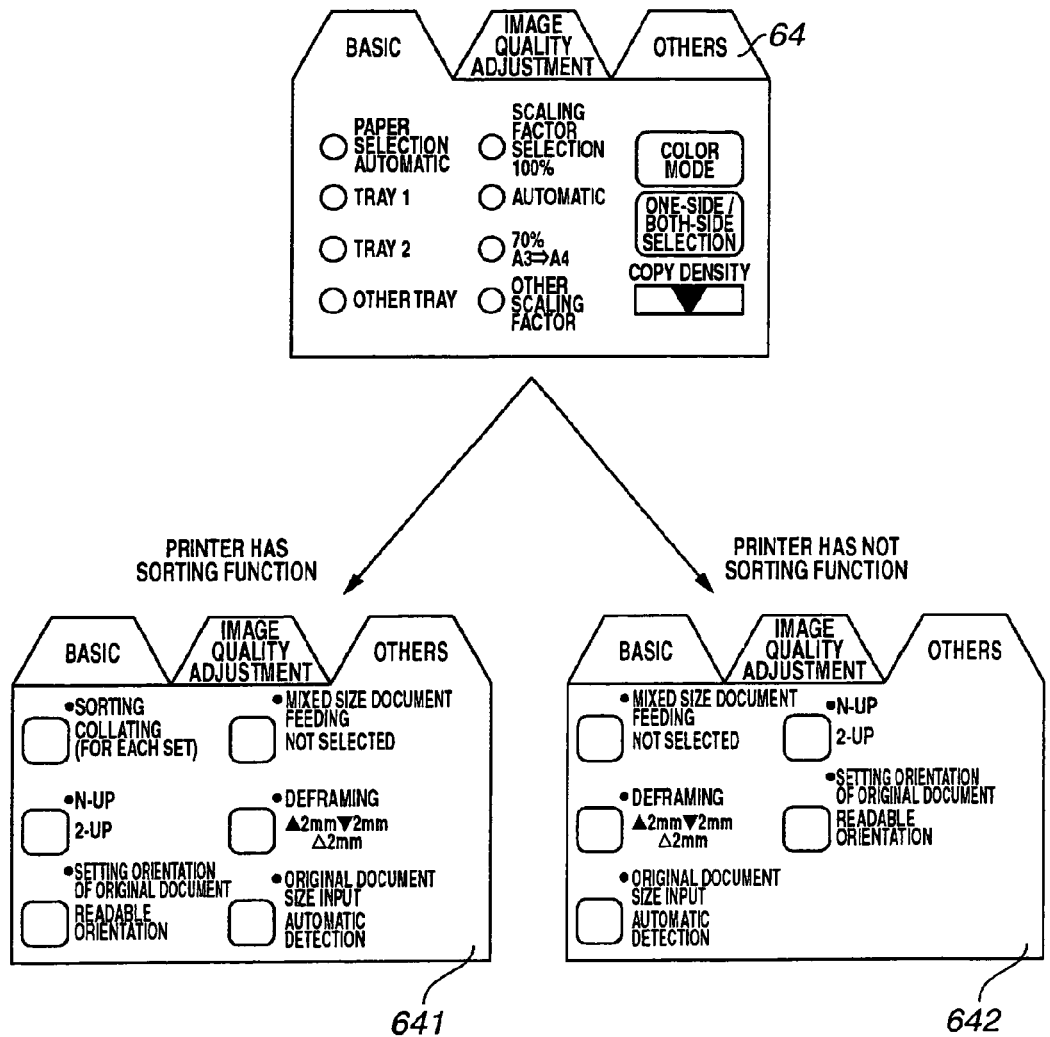
FIG. 9 shows screen images showing examples of "Others" setting screens that are displayed when "Others" is selected on the basic setting screen, for a case when the printer has the sorting function and for a case when the printer does not have the sorting function.

FIG. 9 shows examples of screen images that are displayed when the scanner 10 restructures the display contents, depending on whether or not the printer 20 has a sufficient memory capacity on a hard disc or the like, and whether or not the printer 20 supports the sorting (collating) function.

The scanner 10 determines, based on the printer capability information 222 notified by the printer 20, whether or not the printer 20 has a hard disc, and whether or not the printer 20 supports the sort-printing function to accumulate print data for page by page and to print multiple sets of multiple pages.

When the "Others" tab (tab 64 in FIG. 9) is selected from the tab switch screen, the screen 641 of FIG. 9 is displayed to show the setting items relating to the sorting function if the printer capability information 222 indicates that the printer has the sorting function. In contrast, if the connected printer 20 does not have the sorting function, the screen 642 of FIG. 9 is displayed in which setting items relating to the sorting function are not displayed.

Figure 10:
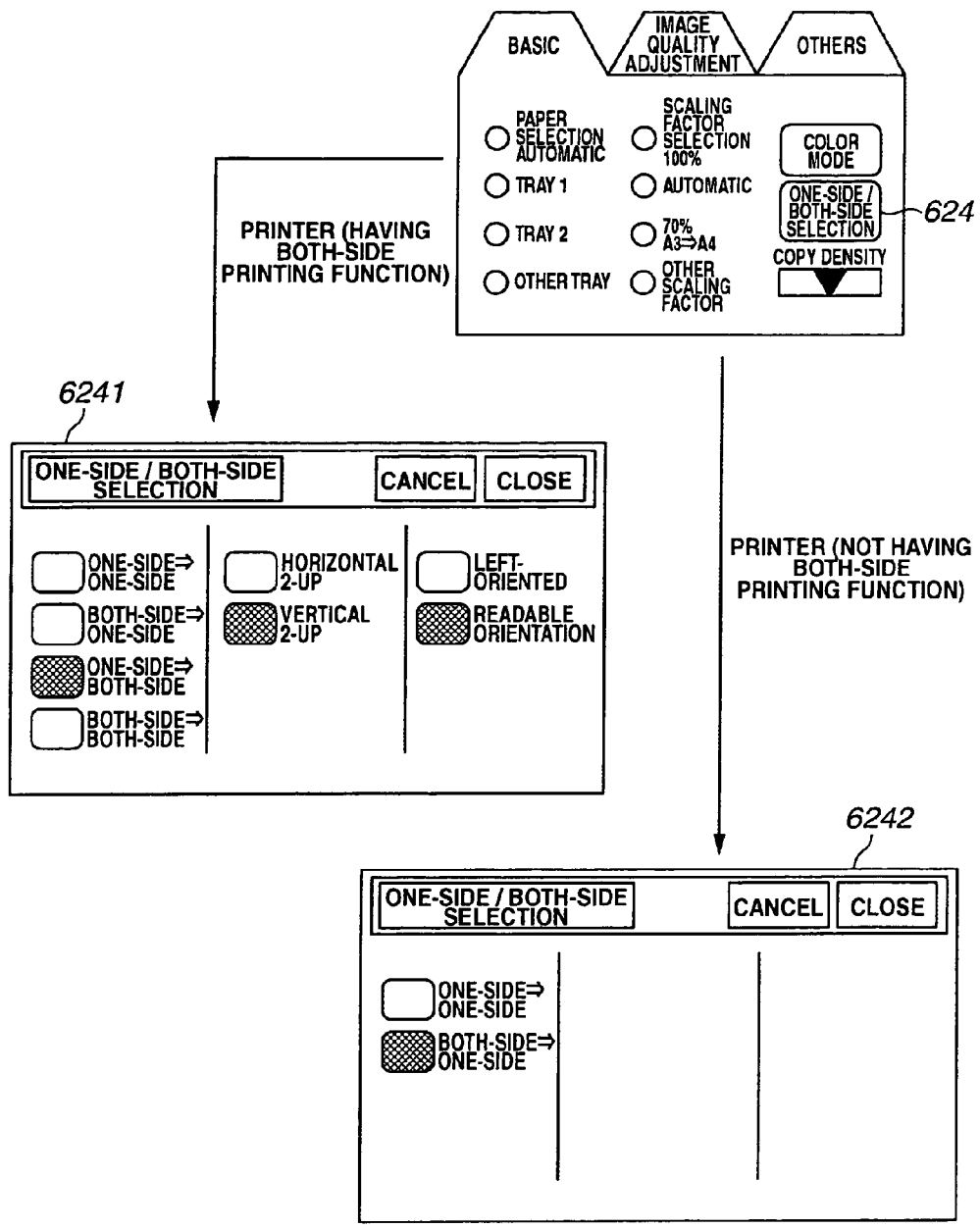
FIG. 10 shows screen images showing a difference between sub-screens which are displayed by the pressing of a one-side/both-side selection button, depending on whether or not an output printer has the both-side printing function.

FIG. 10 shows examples of screen display images which are displayed when the scanner 10 specifies selectable combinations of the number of sides of the original document to be scanned and the number of output paper sides to be printed, depending on whether or not the printer 20 has the both-side printing function.

When a both-side/one-side selection button 624 is selected on the basic tab switch screen 62, the scanner 10 acquires information on whether or not the output printer 20 has the both-side printing function from the printer capability information 222, acquiring information on the number of original document sides that can be scanned by the image reading unit 16 of the scanner 10 from the scanner capability information 121, and determines a list of displayable options according to combinations of the acquired information.

For example, when the printer 20 has the both-side printing function, the selection parameters for the display items that are marked with a white circle in the column of "Having Both-side printing function", from among those displayed in FIG. 6, are displayed in a sub-screen 6241 shown in FIG. 10.

When the printer 20 does not have the both-side printing function, and the original document to be scanned has an image printed on the both sides, the scanner 10 displays the selection items that are marked with a white circle in the column of "Not Having Both-side printing function" including "One-Side=>One-Side" in a sub-screen 6242 shown in FIG. 10.

(Description of Operation)

Figure 11:
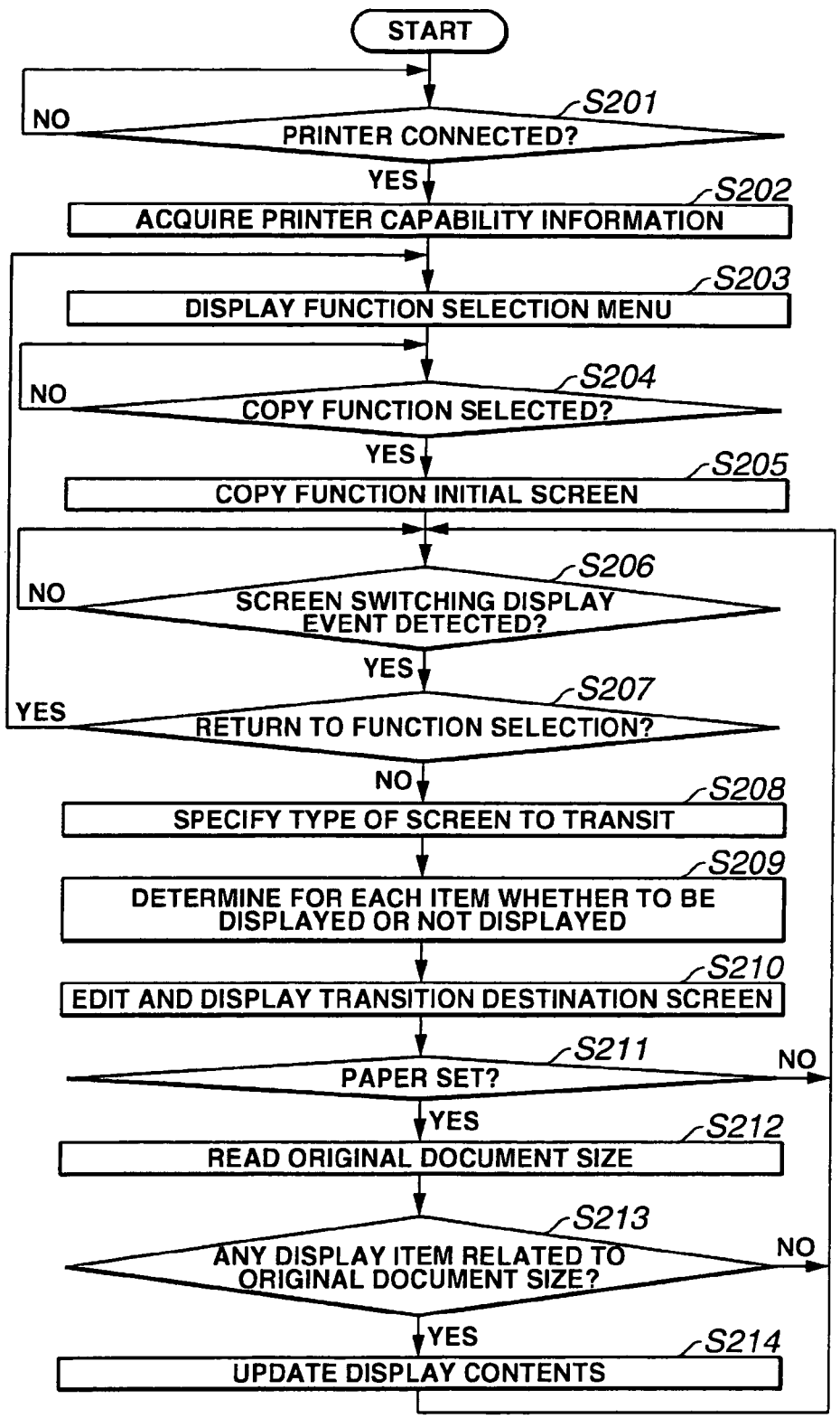
FIG. 11 is a flowchart showing an example of operation steps performed by the scanner when the scanner detects connection of a printer, and acquires capability information from the printer to display the same on a main menu, and the copy function is selected in the main menu.

FIG. 11 is a flowchart illustrating an example of operation of the scanner 10 when the scanner 10 detects the connection of the printer 20, and acquires the printer capability information 222 from the printer 20 to display the main menu 60, and the copy function is selected on the main menu 60.

When the scanner 10 detects the connection of the printer 20 by sensing the connection of the USB cable 70 connected to the printer 20, or the operation to reset or turn on the power supply (YES in S201), the scanner 10 transmits a command to request notification of the printer capability information 222 to the printer 20 through the USB interface 13, and acquires printer capability information 222 managed by the printer memory 22 from the printer 20 (S202).

The scanner 10 displays the main menu 60 on the scanner display portion 151 (S203).

When detecting the user's operation to select the copy function on the main menu 60 (YES in S204), the scanner 10 displays the initial screen for the copy function on the display portion 151 of the scanner operation panel (S205), and monitors the user's setting operation of the copy function, operation of the tab switch screen relating to the copy function or operation to return to the main menu 60 (NO in S206).

When detecting an event of switching the tab screen by the user (YES in S206), the scanner 10 determines a type of screen designated as the transition destination (S207). When detecting an operation to return to the main menu 60 or when detecting time-out indicating that a predetermined time has elapsed (YES in S207), the scanner 10 displays the main menu 60 (S203).

If a screen other than the main menu 60 is designated (NO in S207), the scanner 10 specifies a type of the screen of the transition destination based on screen operation information (S208), and determines whether each of the items to be displayed corresponding to the specified screen type is to be displayed or not displayed based on the printer capability information 222 and the screen management information 123 acquired in step S202 (S209). The scanner 10 then switches the screen display to the screen of the transition destination (S210).

When an original document to be copied is set on the image reading unit 16 (YES in 211), the scanner 10 reads the size of the original document (S212).

If there are display items, in the currently displayed setting screen, that require restructuring of the display contents according to the size of the original document thus read (YES in S213), the scanner 10 reextracts display items and selection parameters of the display items according to the size of the original document size and updates the display contents (S214).

The scanner and the control method for the display of the scanner's operation menu according to the present invention are applicable to a printing system having a scanner and a printer connected to each other, and having a copy function to cause the printer to print out an image read by the scanner. The present invention is particularly effectively applicable to the display control when the copy function is utilized on the scanner's UI.

As described above, according to an aspect of the present invention, a scanner which is connected via network or locally connected to a printer for realizing a copying function by outputting a scanned image to the printer as a copy job, the scanner, comprises a menu display that displays an operation menu of the copying function on a display portion; a capability information reception unit that receives capability information from the printer; an available setting item determination unit that determines print setting items relating to the copying function that can be provided, based on the capability information; and a display controller that selectively displays display contents of the operation menu displayed by the menu display, based on the setting items determined by the available setting item determination unit.

According to another aspect of the present invention, the capability information that the capability information reception unit receives from the printer may be information relating to memory capacity of the printer, and the display controller displays the display contents of the operation menu displayed by the menu display in terms of a printing function that can be provided according to the size of the memory capacity of the printer.

According to still another aspect of the present invention, the capability information reception unit receives from the printer may be information relating to a size of printing paper that can be loaded on the printer, and the display controller displays the display contents of the operation menu displayed by the menu display in terms of combinations of enlargement and reduction that can be provided by the size of printing paper that can be loaded on the printer.

According to yet another aspect of the present invention, the capability information that the capability information reception unit receives from the printer may be information relating to a both-side printing function by a paper feed mechanism of the printer, and the display controller displays the display contents of the operation menu displayed by the menu display in terms of the both-side printing function that can be provided by the printer.

According to even another aspect of the present invention, the capability information that the capability information reception unit receives from the printer may be information relating to an image processing function that is performed when printing the image, and the display controller displays the display contents of the operation menu displayed by the menu display in terms of the image processing function that can be provided by the printer.

According to further aspect of the present invention, the capability information that the capability information reception unit receives from the printer may be information relating to a color conversion processing function that is performed when printing the image.

According to still further aspect of the present invention, a control method for displaying an operation menu of a scanner which is connected via network or locally connected to a printer for realizing a copying function by outputting a scanned image to the printer as a copy job, comprises displaying, by a menu display, an operation menu of the copying function on a display portion; receiving, by a capability information reception unit, capability information of the printer from the printer; determining, by an available setting item determination unit, print setting items relating to the copying function that can be provided based on the capability information; and selectively displaying, by a display controller, contents of the operation menu displayed by the menu display based on the setting items determined by the available setting item determination unit.

The foregoing description of the embodiment of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-276027 filed on Sep. 22, 2005 including specification, claims, drawings and abstract is incorporated herein by reference in its entirety.

What is claimed is:

1. A scanner which is connected via network or locally connected to a printer for realizing a copying function by outputting a scanned image to the printer as a copy job, the scanner, comprising:
    a size acquiring unit that acquires a size of the scanned image;
    a display request detection unit that detects an operation menu display request of the copying function;
    a capability information acquisition requesting unit that requests capability information from the printer upon detection of the operation menu display request by the display request detection unit;
    a capability information reception unit that receives the capability information from the printer, the capability information being sent from the printer side in response to a request from the capability information acquisition requesting unit or being autonomously sent to the scanner at a proper time from the printer side;
    an available setting item determination unit that determines print setting items relating to the copying function that can be provided by the printer, based on the size of the scanned image acquired by the size acquiring unit and the capability information which is received by the capability information acquisition requesting unit or received by the capability information reception unit; and
    a display controller that displays available setting items in the operation menu every time the display request detection unit detects the operation menu display request on a basis of the setting items determined by the available setting item determination unit, and if display contents need to be restructured according to the size of the image, displays the available setting items by restructuring the display contents relating to the copying function that can be provided by the printer.

2. The scanner according to claim 1, wherein the capability information that the capability information reception unit receives from the printer is information relating to memory capacity of the printer, and the available setting item determination unit determines the print setting items relating to the copying function that can be provided by the printer according to the size of the memory capacity of the printer.

3. The scanner according to claim 1, wherein the capability information that the capability information reception unit receives from the printer is information relating to a size of printing paper that can be loaded on the printer, and the available setting item determination unit determines the print setting items in terms of combinations of enlargement and reduction that can be provided by the size of printing paper that can be loaded on the printer and the size of the scanned image acquired by the size acquisition unit.

4. The scanner according to claim 1, wherein the capability information that the capability information reception unit receives from the printer is information relating to a both-side printing function by a paper feed mechanism of the printer, and the available setting item determination unit determines the print setting items in terms of the both-side printing function that can be provided by the printer.

5. The scanner according to claim 1, wherein the capability information that the capability information reception unit receives from the printer is information relating to an image processing function that is performed when printing the image, and the available setting item determination unit determines the print setting items in terms of the image processing function that can be provided by the printer.

6. The scanner according to claim 1, wherein the capability information that the capability information reception unit receives from the printer is information relating to a color conversion processing function that is performed when printing the image, and the available setting item determination unit determines the print setting items in terms of the color conversion processing function that can be provided by the printer.

7. The scanner according to claim 1, wherein
the available setting item determination unit determines a selectable scaling factor according to a combination of the size of the scanned image acquired by the size acquiring unit and a size of paper that can be loaded in the printer from among items of enlargement and reduction ratios determined by a combination of the capability information received by the capability information reception unit and capability information of the scanner.

8. A control method for displaying an operation menu of a scanner which is connected via network or locally connected to a printer for realizing a copying function by outputting a scanned image to the printer as a copy job, comprising:
determining, by an available setting item determination unit, print setting items relating to the copying function that can be provided by the printer based on a size of the scanned image acquired by a size acquiring unit and capability information which is requested by a capability information acquisition requesting unit in the scanner upon detection of an operation menu display request of the copying function by means of a display request detection unit and sent from the printer in response to a request from the capability information acquisition requesting unit, or which is autonomously sent to the scanner at a proper time from the printer and received by a capability information reception unit; and
displaying, by a display controller, available setting items in the operation menu every time a display request detection unit detects an operation menu display request on a basis of the printing setting items determined by the available setting item determination unit, and if display contents need to be restructured according to the size of the image, displaying the available setting items by restructuring display contents relating to the copying function that can be provided by the printer.

* * * * *